(12) United States Patent
Singh

(10) Patent No.: US 6,434,936 B1
(45) Date of Patent: Aug. 20, 2002

(54) SUPER DIESEL APPARATUS

(76) Inventor: Daljit Singh, 1646 Parkcrest Cir., #100, Reston, VA (US) 20190

( * ) Notice: Subject to any disclaimer, the term of this patent is extended or adjusted under 35 U.S.C. 154(b) by 0 days.

(21) Appl. No.: 09/841,603

(22) Filed: Apr. 25, 2001

Related U.S. Application Data

(60) Provisional application No. 60/199,378, filed on Apr. 25, 2000, and provisional application No. 60/216,672, filed on Jul. 7, 2000.

(51) Int. Cl.$^7$ .................................................. F02G 1/00
(52) U.S. Cl. ............................. 60/597; 60/598; 60/605.1
(58) Field of Search ............................... 60/597, 605.1, 60/598

(56) References Cited

U.S. PATENT DOCUMENTS

| | | | |
|---|---|---|---|
| 3,996,793 A | * 12/1976 | Topper | ................... 73/117.1 |
| 4,221,206 A | * 9/1980 | Haas | ................... 123/198 DC |
| 4,258,550 A | * 3/1981 | Hinkle | ................... 60/599 |
| 4,694,654 A | * 9/1987 | Kawamura | ................... 60/605 |
| 4,886,978 A | * 12/1989 | Kawamura | ................... 60/597 X |
| 6,058,916 A | * 5/2000 | Ozawa | ................... 123/559.3 |

* cited by examiner

Primary Examiner—Hoang Nguyen
(74) Attorney, Agent, or Firm—Rodger H. Flagg

(57) ABSTRACT

An exhaust driven turbofan to operates a generator, for generating electrical energy, which is stored in a battery until needed. An air blower is powered by energy from the battery, to generate pressurized air. The pressurized air passes into the piston chamber when the gas pedal is depressed, independent of the rotation of the crank shaft. An exhaust blower powered by the battery, sucks air from the piston chamber during the exhaust stroke, ensuring complete removal of the exhaust gasses. Valve overlap timing is no longer needed, eliminating the dwell time between intake and exhaust gasses. A non-ferrous wheel having ferrous portions is anchored in spaced relation about the outer periphery of the non-ferrous wheel, to assist the rotation of the crank shaft. At least one electromagnet is selectively energized to aid rotation of the non ferrous wheel. A diesel injector nozzle is positioned across the head of the combustion chamber for direct injection of diesel fuel as the piston power stroke approaches maximum extension. The diesel injector nozzle includes a sodium filled outer body to delay heating the fuel at the nozzle. Rotating bearings are disposed at every rotational part of the diesel engine.

18 Claims, 8 Drawing Sheets

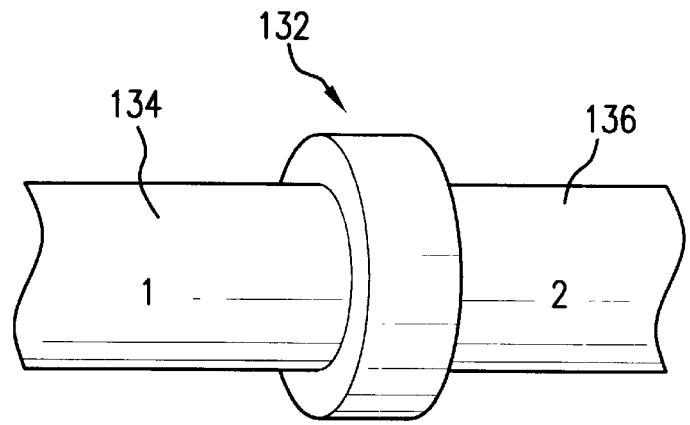
FIG.8A
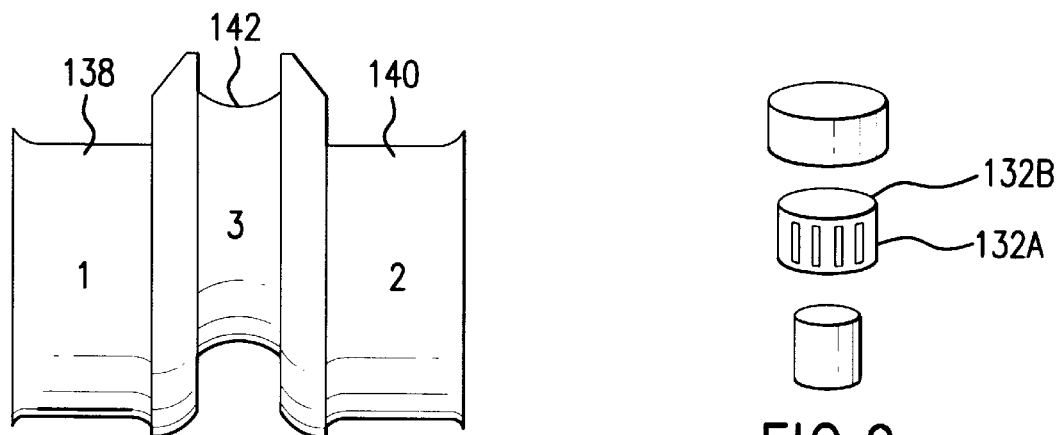
FIG.8B
FIG.9
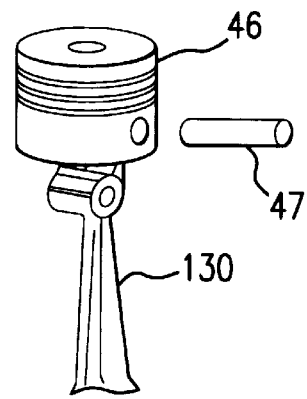
FIG.10

SUPER DIESEL APPARATUS

This utility patent application claims priority of provisional patent application 60/199,378 filed 04/25/2000 by Daljit Singh, entitled Super Diesel Apparatus and 60/216,672 filed 07/07/2000 by Daljit Singh, entitled Super Diesel Apparatus II.

FIELD OF THE INVENTION

This invention relates to diesel engines, and more particularly to an electrically powered intake blower which provides pressurized air to the intake stroke, and an electrically powered exhaust blower to suck exhaust gasses from the cylindrical chamber during the exhaust stroke. The intake blower and exhaust blower are powered by a generator driven by the exhaust gasses exiting from the diesel engine, and the electrical current from the generator is stored by a battery until needed.

This invention is further directed to diesel engines, and more particularly to improvements in the compression stroke and power stroke of a four stroke diesel engine, and to improved performance by reducing frictional losses by utilizing ball or needle bearings at every rotational part of the diesel engine.

DESCRIPTION OF THE PRIOR ART

Turbochargers are known to rotate a turbine at high speed to pressurize intake air for supercharging an engine.

U.S. Pat. 3,680,305 issuing to Miller discloses a turbine for driving an electrical generator, which in turn is adapted to drive a compressor.

U.S. Pat. 4,669,269 issuing to Dinger discloses using two electrically driven air compressors to turbo-charge an engine.

U.S. Pat. 4,950,193 issuing to Kawamura discloses a generator for charging a battery to compress air for turbo-charging an engine.

U.S. Pat. 4,998,951 issuing to Hideo Kawamura discloses a turbocharger control system, which utilizes an on-off valve to reduce the time lag for supplying pressurized air when the engine is accelerated.

U.S. Pat. 5,299,547 issuing to Michimasa discloses a compressor and air tank for use with a fuel injection mechanism for use with diesel engines.

U.S. Pat. 5,819,538 issuing to Lawson discloses the use of a compressed air tank to supply compressed air for immediate acceleration.

SUMMARY OF THE INVENTION

The present invention utilizes an exhaust driven turbofan to operate a generator, which generates electrical energy. The electrical energy is stored in a battery until needed. This electrical energy generated by the exhaust gasses is used to operate auxiliary engine components. An electric powered air blower is powered by the battery, to generate pressurized gasses, which supply extra pressurized air into the piston chamber when the gas pedal is depressed, independent of the rotation of the crankshaft. This eliminates the time lag between acceleration and the supply of the pressurized air into the piston chamber during the intake stroke. An exhaust blower powered by the battery, sucks air from the piston chamber during the exhaust stroke, ensuring complete removal of the exhaust gasses. This saves fuel and reduces pollution. Valve overlap is no longer needed, and the interference between intake and exhaust gasses is virtually eliminated.

The compression stroke is the most energy consuming portion of a diesel engine, as the energy required to compress air within a diesel combustion chamber requires two to three times the compression of air required in a gasoline engine between bottom dead center and top dead center. The compression stroke is assisted by rotation of a non-ferrous wheel having a plurality of ferrous portions anchored in spaced relation about the outer periphery of the non-ferrous wheel. The energy required to energize the electromagnet is obtained at least in part from the generator driven by the exhaust gasses.

The power stroke is modified to include a diesel injector nozzle which is positioned across the head of the combustion chamber for direct injection of diesel fuel as the piston approaches maximum extension within the cylinder wall. The diesel injector nozzle includes a sodium filled outer body to delay heating the fuel at the nozzle, resulting in more power output at maximum compression.

Tapered ball or needle bearing are disposed at every rotational part of the diesel engine to increase engine efficiency by reducing energy loss.

The above and other objects, features and advantages of the present invention will become more apparent from the following description when taken in conjunction with the accompanying drawings, in which a preferred embodiment of the present invention is shown by way of an illustrative example.

BRIEF DESCRIPTION OF THE DRAWINGS

FIG. 8A is a diagram showing a camshaft bearing surface sized to receive a rotating bearing thereon.

FIG. 8B is a diagram showing a main bearing journal and a connecting rod bearing journal sized to receive a rotating bearing thereon.

FIG. 9 is a detail view of a rotating bearing having a tapered roller bearing rotatably positioned between the inner race and the outer race.

FIG. 10 is a detail view of a piston connected to a connecting rod with a rotatable piston pin.

DESCRIPTION OF A PREFERRED EMBODIMENT

This invention may be adapted for use in both mobile and stationary applications. Mobile applications include vehicles such as cars, trucks, vans, busses, boats, ships, locomotives, construction equipment, and farm equipment, for example. Stationary applications include power generators, motorized pumps, compressors, cranes, shovels, etc.

Horse power requirements may range from two horse power to 5,000 horse power, or more. The novel features of this invention may be adapted for use in diesel engines 10 having from one cylinder to 24 cylinders, or more. Displacement of the diesel engine 10 may be as small as 100 cubic centimeters, to more than 500 liter engine category. This invention may be adapted to in-line engines, V-type engines, W style engines, etc.

Figure 1:
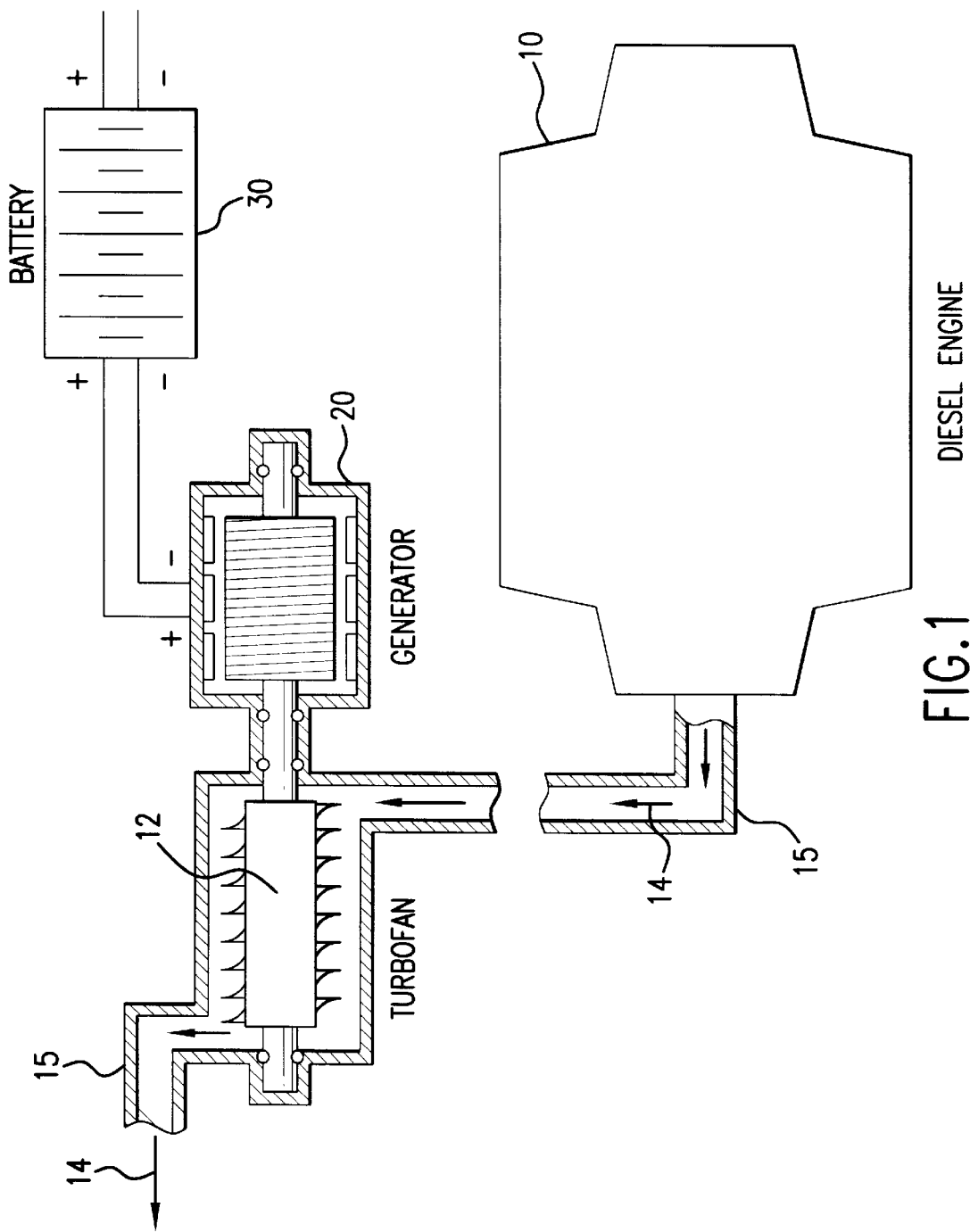
FIG. 1 is a diagram showing a turbofan driven by exhaust gasses from a diesel engine to energize a generator, which charges a battery.

FIG. 1 is a diagram showing a turbofan 12 driven by exhaust gasses 14 passing through an exhaust passage 15 from a diesel engine 10 to energize a generator or alternator 20 which charges a battery 30, in a manner well known in the art. (For purposes of this disclosure, an alternator will hereafter be included within the scope of the term generator 20).

The exhaust gasses 14 exiting from the diesel engine 10 through the exhaust passage 15, causes rotation of the turbofan 12. Rotation of the turbofan 12 causes rotation of the generator 20, which sends electrical current 32 through wires 34 to charge the battery 30. The battery 30 stores electrical energy until needed. This substantially free energy generated by the turbofan 12, when converted by the generator 20 to electrical energy and stored by battery 30, may be used to control optional engine components, such as air supply, fuel supply, internal lubrication, cooling, etc.

Figure 2:
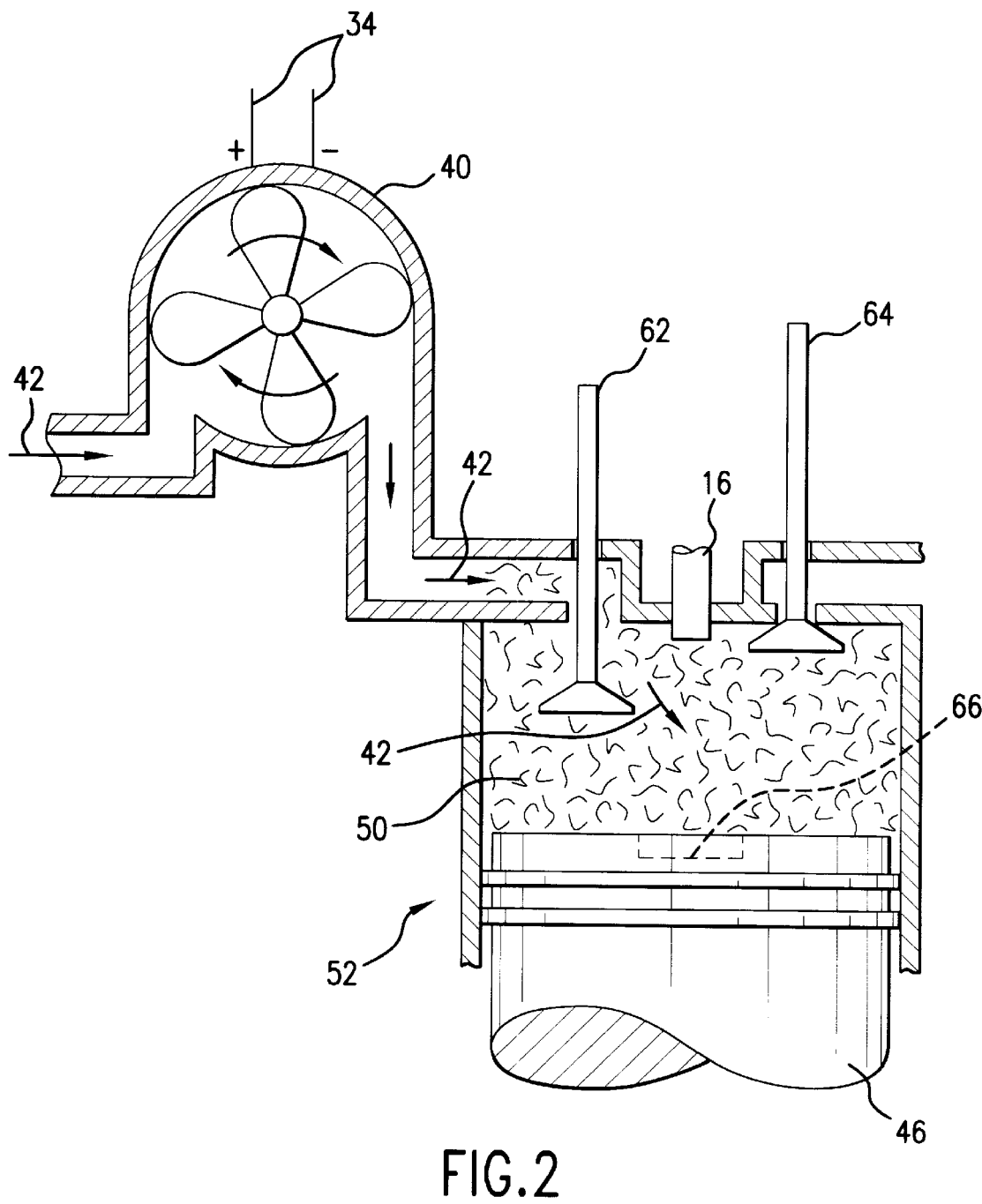
FIG. 2 is a diagram showing an intake blower driven by the battery to supply pressurized air to the piston chamber during the intake stroke.

FIG. 2 is a diagram showing an intake blower 40 driven by the battery 30 to supply pressurized air 42 through an intake passage 44 as the piston 46 is lowered during the intake stroke 52, to supply additional pressurized air 42 to the piston chamber 50.

Figure 5:
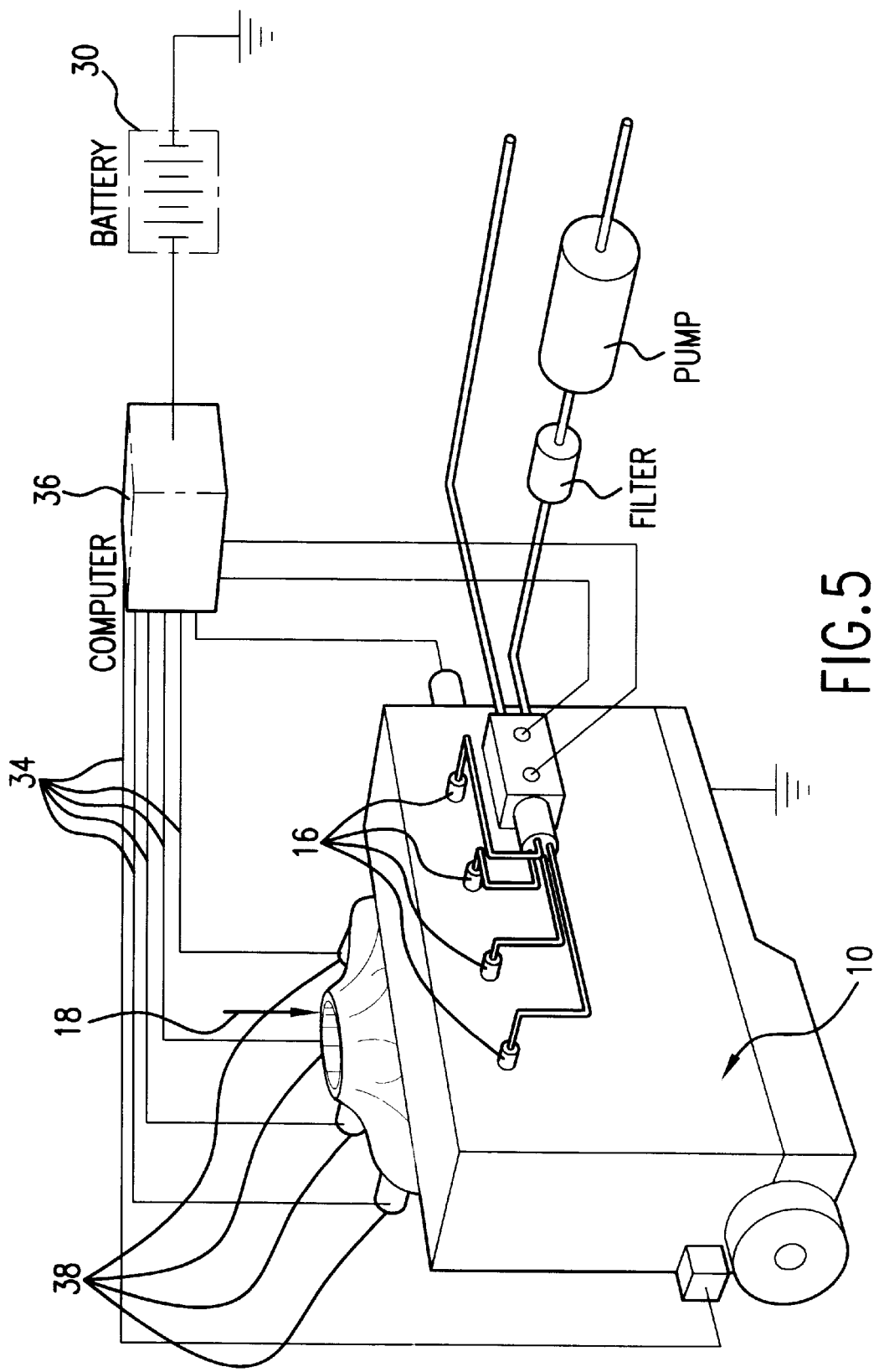
FIG. 5 is a schematic view of a diesel engine showing the relationship of the computer and sensors to the battery.

As shown in FIG. 5, the ratio of fuel supply 16 to air intake 42 is controlled by a computer or computer chip 36 responsive to a sensor 38, to optimize the relationship of fuel-to-air during actuation of the diesel engine 10. Any known computer or computer chip 36 for controlling the ratio of pressurized air-to-fuel in a diesel engine, may be used. Likewise, any known sensor 38 for sensing the ratio of pressurized air-to-fuel, may also be used. Input from the sensor 38 is communicated to the computer chip 36, which controls the input of fuel 16 in accordance with the desired air-to-fuel ratio, independent of the position of the crankshaft 48.

The pressurized air intake 42 and fuel supply 16 are controlled by the computer or computer chip 36 and sensor 38, to preferably control the ratio from one part fuel 16 to between 125,000 to 150,000 parts pressurized air. Traditional diesel engines run on a ratio of one part fuel to between 100,000 to 125,000 parts pressurized air 42. This higher air ratio results in more power and less pollution. As a result, each power stroke 56 will be air rich 42, not fuel rich 16, resulting in an overall energy savings.

Figure 3:
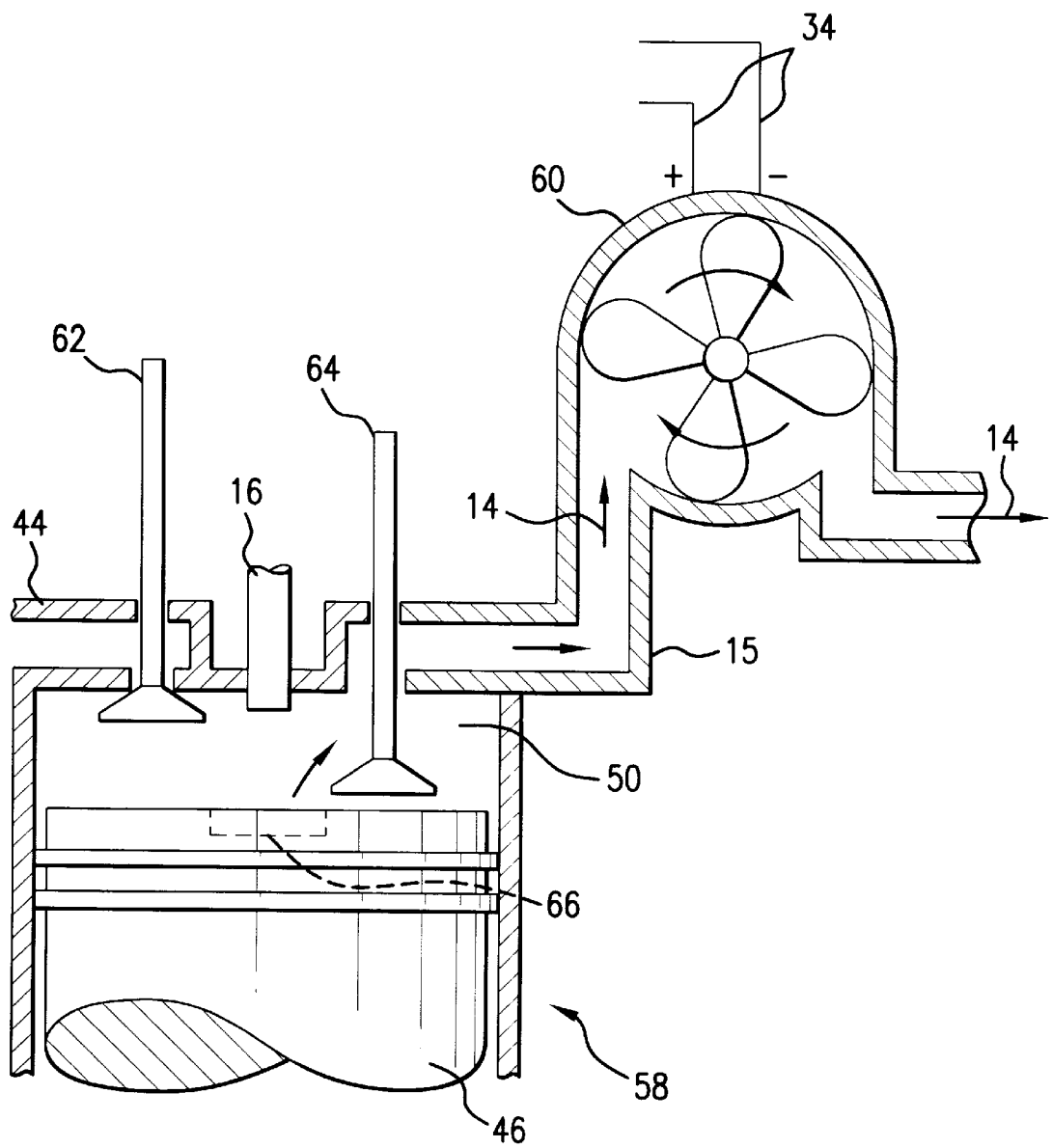
FIG. 3 is a diagram showing an exhaust blower driven by the battery to suck exhaust gasses from the piston chamber during the exhaust stroke.

FIG. 3 is a diagram showing an exhaust blower 60 driven by electrical energy from the battery 30, to suck exhaust gasses 14 from the piston chamber 50 during the exhaust stroke 58. The exhaust gasses 14 are sucked into the exhaust passage 15 during the exhaust stroke 58, virtually eliminating any exhaust gasses 14 remaining in the piston chamber 50 upon completion of the exhaust stroke 58.

A detent 66 in the top of the piston 46 provides a controlled space for air and fuel when the piston 46 is raised to its maximum height in the piston chamber 50.

Figure 4:
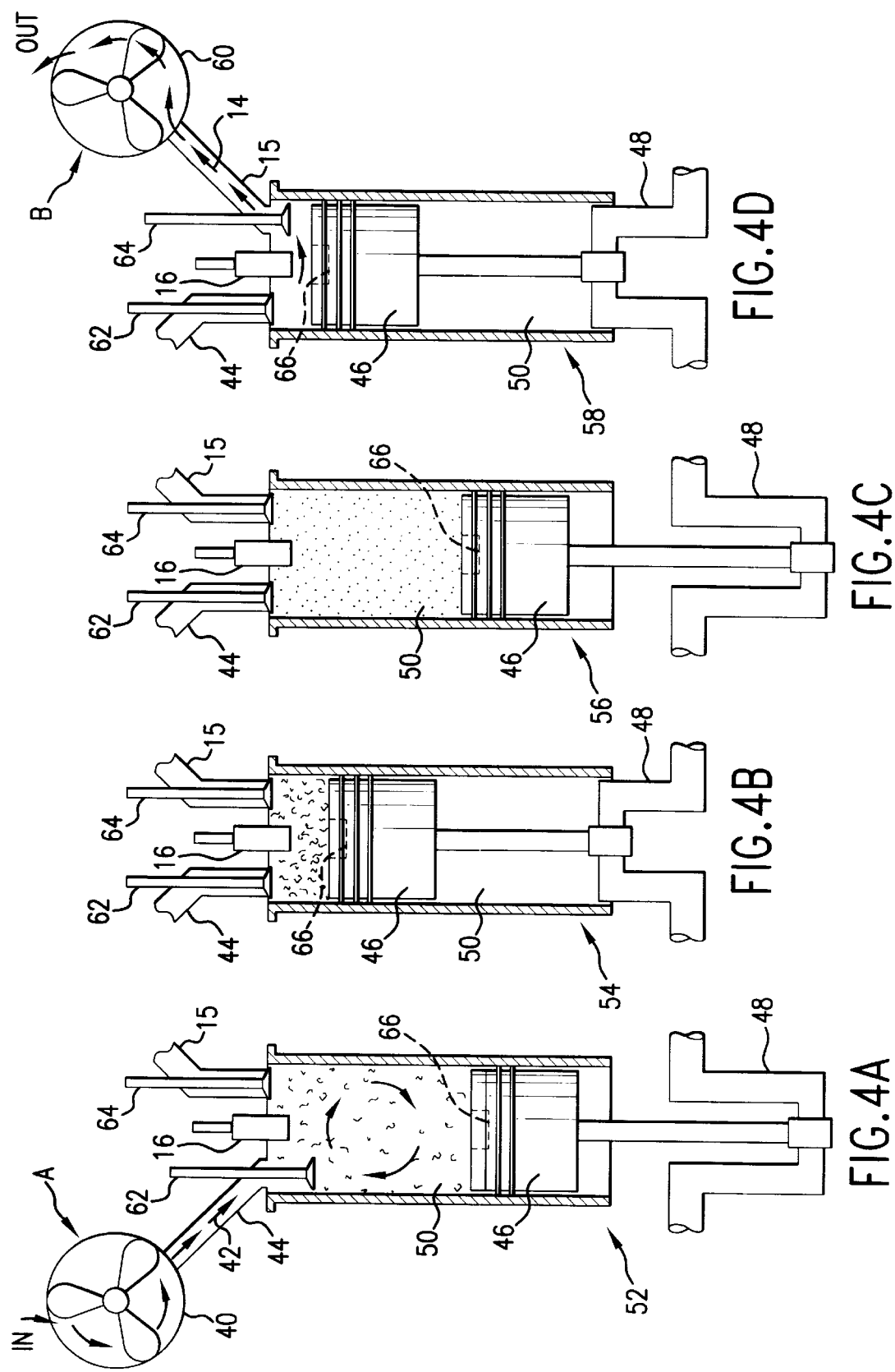
FIG. 4A shows the intake stroke of a sequential four stroke diesel engine, with an intake blower actuated independently of the rotation of the crankshaft, to supply additional intake air into the cylinder chamber during the intake stroke.
FIG. 4B shows the compression stroke of a sequential four stroke diesel engine.
FIG. 4C shows the power stroke of a sequential four stroke diesel engine.
FIG. 4D shows the exhaust stroke of a sequential four stroke diesel engine, with the exhaust blower operated during the exhaust stroke, independently of the rotation of the crankshaft, to withdraw virtually all of the exhaust gasses from the piston chamber 50 prior to initiation of the intake stroke.

FIG. 4A shows the intake stroke 52 of a sequential four stroke diesel engine 10, with an intake blower 40 actuated independently of the rotation of the crankshaft 48, to supply additional pressurized intake air 18 into the piston chamber 50 during the intake stroke 52.

FIG. 4B shows the compression stroke 54 of a sequential four stroke diesel engine 10, which raises the piston 46 within the piston chamber 50 to compress the fuel gasses and air located within the piston chamber 50.

A diesel 10 engine does not require a spark plug to combust the air/fuel mixture within the piston chamber 50. Combustion takes place once the air is sufficiently compressed. Glow plugs (not shown) may be used to warm incomming air.

FIG. 4C shows the power stroke 56 of a sequential four stroke diesel engine 10. Upon combustion of the air/fuel mixture, the piston 46 is driven down which causes the crankshaft 48 to rotate. Multiple sequential cycles drive the diesel engine 10.

FIG. 4D shows the exhaust stroke 58 of a sequential four stroke diesel engine 10. During the exhaust stroke 58, the crankshaft 48 raises the piston 46 to force the exhaust gasses from the piston chamber 50. Exhaust gasses 14 not driven from the piston chamber 50 during the exhaust stroke 58, remain in the piston chamber 50 during the intake stroke 52, which reduces engine efficiency, and increases pollution.

The problem of unburned gasses passing from the exhaust stroke 58 to the intake stroke 52 of the piston chamber 50, is eliminated through the use of the exhaust blower 60. The exhaust blower 60 sucks exhaust gasses from the piston chamber 50 during the exhaust stroke 58, independently of the rotation of the crankshaft 48. The exhaust blower 60 withdraws virtually all of the exhaust gasses 14 from the piston chamber 50 during the exhaust stroke 58, prior to initiation of the intake stroke. The timing of the inlet valve 62 and exhaust valve 64 may be precisely timed to eliminate overlapping dwell time, thus increasing the overall efficiency of the diesel engine 10.

As shown in FIG. 4B, the compression stroke 54 of a four stroke diesel engine 10, raises the piston 46 within the piston chamber 50 to compress the fuel gasses and air located within the piston chamber 50. The compression stroke 54 is the most energy consuming portion of a diesel engine 10. The energy required to compress air within a diesel piston chamber 50 requires two to three times the compression of air required in a gasoline engine between bottom dead center and top dead center.

Figure 6:
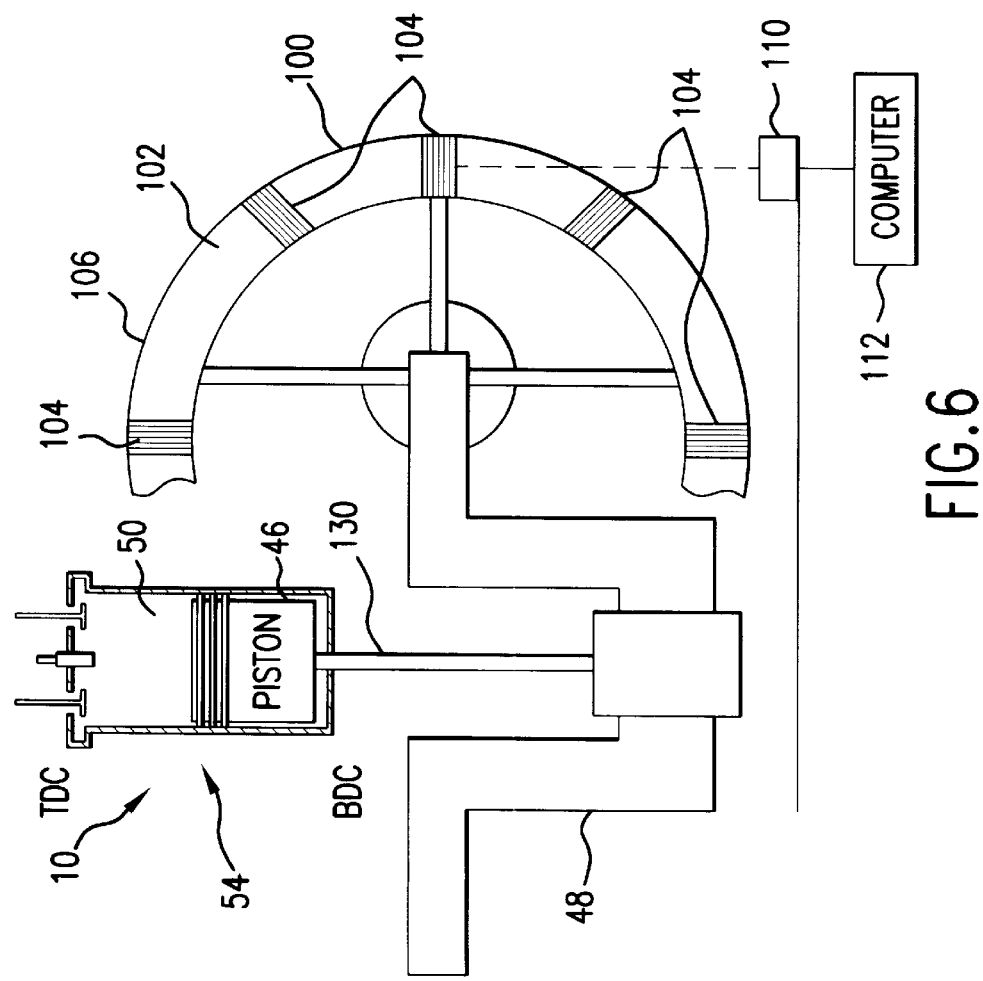
FIG. 6 is a diagram showing a non-ferrous fly wheel connected to the crank shaft of a diesel engine, with spaced ferrous portions extending about the outer periphery of the fly wheel. At least one electromagnet is selectively energized to provide an attractive magnetic field to aid in rotation of the fly wheel to increase efficiency of the diesel engine.

To further improve the efficiency of a diesel engine 10, a rotating flywheel 100 is secured to the crank shaft 48, for rotation, as schematically shown in FIG. 6. The rotating flywheel 100 is preferably made of aluminum or other non-ferrous metal 102. At least one ferrous portion 104 extends about the outer periphery 106 of the fly wheel 100. Preferably, a plurality of ferrous portions 104 are positioned in spaced relation about the outer periphery 106 of the flywheel 100.

At least one electromagnet 1 10 is positioned in spaced, but close proximity to the outer periphery 106 of the rotating fly wheel 100 to provide an attractive force between the ferrous portion 104 and the electromagnet 110, when the electromagnet 110 is selectively energized. A computer 112 preferably controls the actuation of the electromagnet to provide an attractive force, while substantially eliminating the generation of repulsive forces between the electromagnet 1 10 and the ferrous portions 104. This aids in rotation of the flywheel 100, in a manner similar to the propulsion generated by a rail gun (not shown).

Not only will this save energy, the rotating fly wheel 100 also serves to reduce engine vibration during use.

The energy required to energize the electromagnet 110 is generated by a generator 20 which is powered by exhaust gasses 14 coming from the diesel engine 10. Excess energy is preferably stored in a battery 30 until needed.

Thus, the energy generated by the exhaust gasses 14 aids in rotation of the crank shaft 48, which in turn raises the piston 46 during the compression stroke 54. This reduces the amount of fuel required to compress the air and diesel mixture, which saves energy and reduces fuel consumption and engine vibration.

Ignition lag is produced when the diesel fuel is injected into the piston chamber 50 at room temperature. On the other hand, if the diesel fuel is too hot during injection, the diesel fuel tends to leak past the pump plunger, which wastes fuel. The time of ignition of a diesel fuel in a diesel engine 10 is very short, on the order of one-tenth the ignition time of a gasoline engine. Thus, the temperature of diesel fuel during injection into the piston chamber 50 is critical to the performance of a diesel engine 10.

Figure 7:
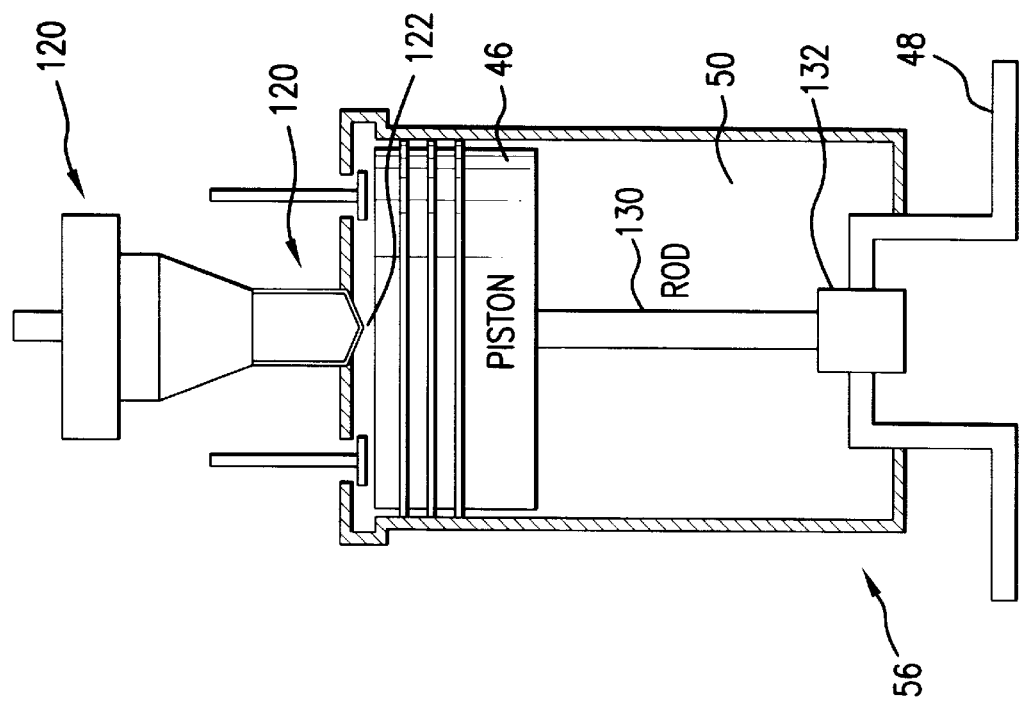
FIG. 7 is a diagram of a diesel injector nozzle having a sodium filled outer body showing the injector nozzle dropped into the combustion chamber to maximize compression of the diesel and compressed air across the head of the compression chamber as the piston reaches the top dead center of the power stroke.

As shown in FIG. 7, the power stroke 56 is modified to include a diesel injector nozzle 120 which is centrally positioned within the piston chamber 50 for direct injection of diesel fuel as the piston 46 approaches maximum extension within the piston chamber 50. The piston 46 is pivotally secured to the connecting rod 130 by a connecting pin 47. The bottom portion of the injector nozzle 120 is preferably made of silicon and chromium. The outer body 122 of the injector nozzle 120 is preferably filled with sodium, which will effectively transfer heat to the diesel fuel just prior to insertion of the diesel fuel into the piston chamber 50. The injected fuel will pass through the injector nozzle 120, which will ignite the fuel in a very short period of time. The bottom portion of the injector nozzle 120 is heated by the compression of the air and gas within the piston chamber 50.

This delays the heating of diesel fuel until needed, which conserves energy. The diesel fuel is disbursed across the head of the piston chamber 50, as the piston 46 approaches top dead center of the power stroke 56 where maximum compression occurs.

Hot fuel atomizes better, bums fast in less time, and generates less exhaust smoke. Thus, fuel injection in diesel engines should be delayed as much as possible to take advantage of the compression of air into energy. By delaying fuel injection until the top dead center of the piston 46 stroke is almost reached, interference is minimized between the compression stroke 54 and power stroke 56, which saves fuel and energy. The bottom portion 122 of the injector nozzle 120 should be as close to the center of the top piston chamber 50 as possible.

Upward and downward movement of the piston 46 is driven by the connecting rod 130, which in turn is driven by the rotation of the crankshaft 48, as shown in FIG. 10. Therefore, to improve the efficiency of a diesel engine 10, it is important to reduce friction during operation of the diesel engine 10.

Thus, as shown in FIGS. 8A and 8B and FIG. 9, the traditional metal bearings should be replaced with low friction rotating bearings 132, such as ball bearings, needle bearings, or roller bearings This preferably includes all bearings on the crankshaft 48, main bearings, rod, cam shaft, piston pin, oil and water pumps, etc.

Where a one piece rotating bearing 132 is difficult to install, a two piece split rotating bearing 132A, 132B should be installed, as best shown in FIG. 9. Rotating bearings 132 will reduce heat and improve efficiency by reducing friction.

Rotating bearing are preferably used on the camshaft bearing surfaces 134, 136 shown in FIG. 8A, and on the main bearing journal surfaces 138, 140 shown in FIG. 8B. Rotating bearings are also preferably used on the connecting rod bearing journal 142.

Where the power generated from exhaust gasses is not sufficient to provide all the energy requirements needed, a conventional generator or alternator 20 may also be used.

Figure 11:
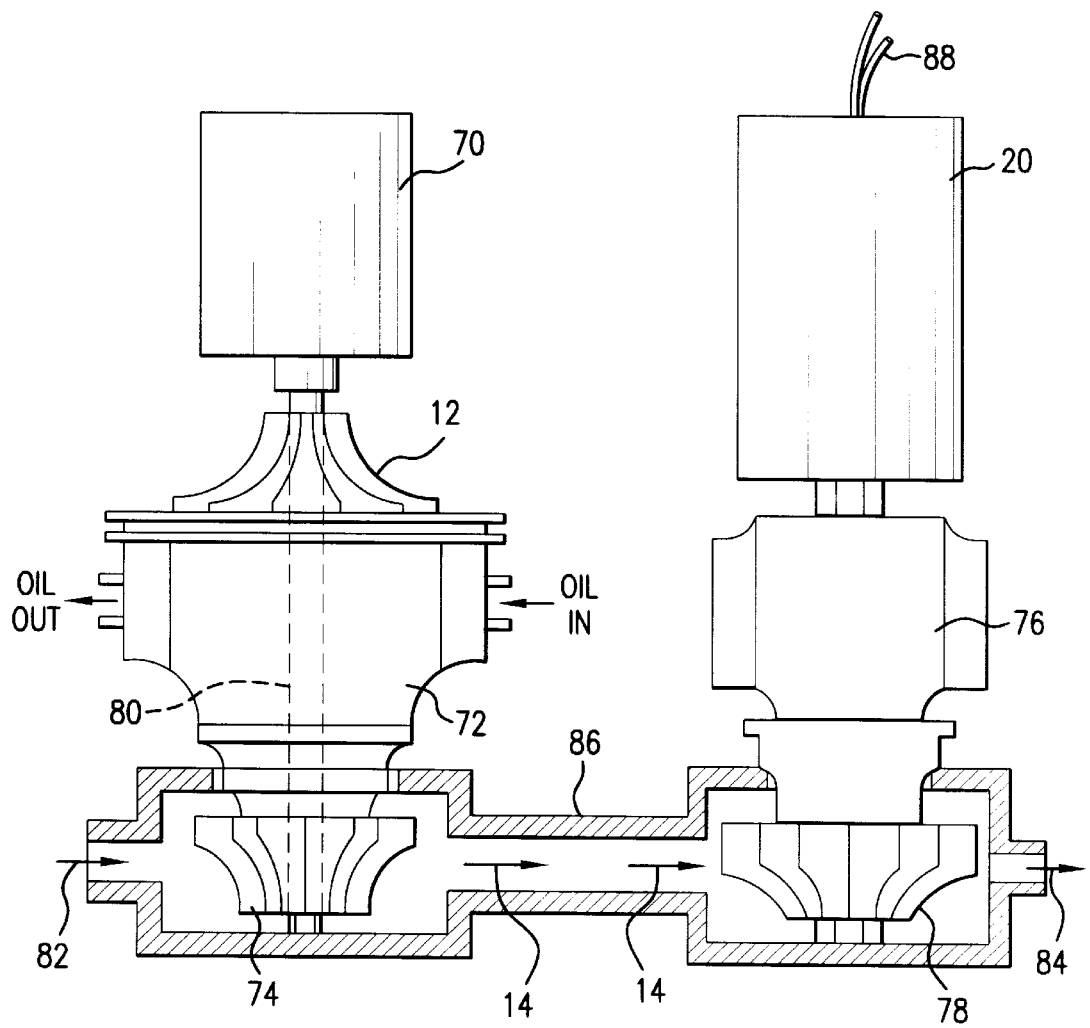
FIG. 11 is a schematic diagram showing a first exhaust blower driven by a motor, and a second exhaust blower driven by a generator.

FIG. 11 shows an alternate embodiment of this invention, where a motor 70 drives a turbofan 12 mounted upon a first housing 72. A shaft 80 connected to the motor 70 at one end, also drives a first exhaust blower 74. An exhaust inlet 82 supplies exhaust gasses to the first exhaust blower 74. Exhaust gasses from the first exhaust blower 74 are directed through an exhaust passageway 86 to a second exhaust blower 78. The second exhaust blower 78 is driven by a generator or alternator 20 which is powered through electrical wires 88 from a remote power source, such as a battery. The generator 20 is mounted to a second housing 76. The exhaust gasses exit through an exhaust outlet 84. The addition of the first exhaust blower 74 and second exhaust blower 78 increases the recycled exhaust gas flow by up to 75%.

Although a certain preferred embodiment has been shown in the drawings and described in the specification, it should be understood that many changes and modifications may be made therein, without departing from the scope of this disclosure, or from the scope of the following claims.

What is claimed is:

1. An improved diesel engine apparatus, which comprises:
 a) a diesel engine having at least one piston chamber, a piston within said piston chamber, said piston driven by a connecting rod rotatably secured to a crankshaft, a gas pedal for controlling the volume of diesel fuel entering the piston chambers during the intake stroke, and an exhaust system to exhaust spent gasses from the piston chamber during an exhaust stroke;
 b) an exhaust driven turbofan to power a generating means, to generate electrical energy;
 c) an electrical storage means for storing said electrical energy generated by said generating means;
 d) an electric powered intake blower powered by the electrical storage means to generate and supply pressurized gasses into the piston chamber when the gas pedal is depressed, independent of the rotation of the crankshaft to eliminate a time lag between acceleration and the supply of the pressurized air into the piston chamber during the intake stroke;

e) an exhaust blower powered by the electrical storage means, to suck exhaust gasses from the piston chamber during the exhaust stroke, to ensure complete removal of the exhaust gasses, which saves fuel and reduces pollution, and f) a motor drives the turbofan, and the turbofan is mounted to a first housing, and a shaft connects the motor to a first exhaust blower, the exhaust gasses from the first blower pass through an exhaust passageway connected to a second exhaust blower, which is driven by a generating means, and the first and second exhaust blowers increase the recycled exhaust flow by up to 75%.

2. The improved diesel engine apparatus of claim 1, wherein a rotating flywheel is secured to the crank shaft, said rotating flywheel having a non-ferrous fly wheel portion with a plurality of ferrous portions anchored in spaced relation about an outer periphery of the non-ferrous fly wheel, and an electromagnet positioned in close proximity to the fly wheel to provide an attractive force to generate additional power to assist rotation of the crankshaft during the compression stroke of said diesel engine.

3. The improved diesel engine apparatus of claim 1, wherein an injector nozzle is positioned across a head portion of the combustion chamber for direct injection of diesel fuel into the combustion chamber as the piston approaches maximum extension within the combustion chamber.

4. The improved diesel engine apparatus of claim 3, wherein said injector nozzle has a sodium and chromium filled outer body to delay the heating of the diesel fuel at the nozzle, resulting in more power output at maximum compression.

5. The improved diesel engine apparatus of claim 1, wherein a bearing means is provided at every rotational part of the diesel engine to increase engine efficiency and reduce energy loss.

6. The improved diesel engine apparatus of claim 1, wherein the diesel engine is adapted for at least one of mobile and stationary applications, said diesel engine having horse power requirements selected from a range of two horse power to more than 5,000 horsepower, said diesel engine further selected from a range of one cylinder to more than 24 cylinders, and engine displacement selected from a range of 10 centimeters to more than 500 liters, and the diesel engine is selected to be one of an in-line engine, a V-type engine and a W-style engine.

7. The improved diesel engine apparatus of claim 1, wherein the generating means used to generate electrical energy is selected from one of: a generator and an alternator.

8. The improved diesel engine apparatus of claim 1, wherein the turbofan is rotated by exhaust gasses exiting from the combustion chamber, and the turbofan rotates a generating means to provide free energy to control optional engine components, including at least one of: an air supply, a fuel supply, and an internal engine lubrication apparatus.

9. The improved diesel engine apparatus of claim 1, wherein the ratio of fuel supply to intake air is controlled by a computer means responsive to a sensor, to optimize the relationship of fuel-to-air during actuation of said diesel engine.

10. The improved diesel engine apparatus of claim 9, wherein the computer means controls the ratio of one part diesel fuel to pressurized intake air in a range of from 125,000 to 150,000 parts pressurized air, to increase power and reduce pollution.

11. The improved diesel engine apparatus of claim 1, wherein exhaust gasses are sucked from the piston chamber during the exhaust stroke, to eliminate exhaust gasses from remaining in the piston chamber upon completion of the exhaust stroke, and enabling the inlet valve and exhaust valve to be precisely timed to eliminate overlapping dwell time, thus increasing the overall efficiency of the diesel engine.

12. The improved diesel engine apparatus of claim 1, wherein a detent is provide in a top portion of the piston to provide a controlled space for air and fuel when the piston is raised to its maximum height in the piston chamber.

13. An improved diesel engine apparatus having at least one piston chamber, a piston within said piston chamber, said piston driven by a connecting rod to a crankshaft, a gas pedal for controlling the volume of diesel fuel entering said piston chamber during the intake stroke, and an exhaust system to exhaust spent gasses from the piston chamber during an exhaust stroke, which comprises:

a) an exhaust driven turbofan to power a generating means, to generate electrical energy;

b) an electrical storage means for storing said electrical energy generated by said generating means;

c) an electric powered intake blower powered by the electrical storage means to generate and supply pressurized gasses into the piston chamber when the gas pedal is depressed, independent of the rotation of the crankshaft to eliminate a time lag between acceleration and the supply of the pressurized air into the piston chamber during the intake stroke;

d) an exhaust blower powered by the electrical storage means, to suck exhaust gasses from the piston chamber during the exhaust stroke, to ensure complete removal of the exhaust gasses, enabling the inlet valve and exhaust valve to be precisely timed to eliminate overlapping dwell time, thus increasing the overall efficiency of the diesel engine; and e) the ratio of fuel supply to intake air is controlled by a computer means responsive to a sensor, to optimize the relationship of fuel-to-air during actuation of said diesel engine; and f) an injector nozzle is positioned across a head portion of the combustion chamber for direct injection of diesel fuel into the combustion chamber as the piston approaches maximum extension within the combustion chamber. and said injector nozzle has a sodium and chromium filled outer body to delay the heating of the diesel fuel at the nozzle. resulting in more power output at maximum compression.

14. The improved diesel engine apparatus of claim 13, wherein a rotating flywheel is secured to the crank shaft, said rotating flywheel having a non-ferrous wheel portion with a plurality of ferrous portions anchored in spaced relation about the outer periphery of the non-ferrous fly wheel, and an electromagnet is positioned in close proximity to the fly wheel to provide an attractive force to generate additional power to assist rotation of the crankshaft during the compression stroke of said diesel engine.

15. The improved diesel engine apparatus of claim 13, wherein a bearing means is provided at every rotational part of the diesel engine to increase engine efficiency and reduce energy loss.

16. The improved diesel engine apparatus of claim 13, wherein a motor drives a turbofan mounted to a first housing, and a shaft connects the motor to a first exhaust blower, the exhaust gasses from the first blower pass through an exhaust passageway connected to a second exhaust blower, which is driven by a generating means, and the first and second exhaust blowers increases the recycled exhaust flow by up to 75%.

17. An improved diesel engine apparatus, which comprises:
  a) an exhaust driven turbofan to power a generating means, to generate electrical energy;
  b) an electrical storage means for storing said electrical energy generated by said generating means;
  c) an electric powered intake blower powered by the electrical storage means to generate and supply pressurized gasses into a piston chamber when a gas pedal is depressed, independent of the rotation of a crankshaft to eliminate a time lag between acceleration and the supply of pressurized air into the piston chamber during an intake stroke;
  d) an exhaust blower powered by the electrical storage means, to suck exhaust gasses from the piston chamber during a exhaust stroke, to ensure complete removal of the exhaust gasses from the piston chamber, enabling an inlet valve and an exhaust valve to be precisely timed to eliminate overlapping dwell time, which saves fuel and reduces pollution;
  e) a computer means responsive to a sensor to control the ratio of fuel supply to intake air, to optimize the relationship of fuel-to-air during actuation of said diesel engine; and
  f) a bearing means is provided at every rotational part of the diesel engine to increase engine efficiency and reduce energy loss.

18. The improved diesel engine apparatus of claim 17, wherein a rotating flywheel is secured to the crank shaft, said rotating flywheel having a non-ferrous wheel portion with a plurality of ferrous portions anchored in spaced relation about the outer periphery of the non-ferrous fly wheel, and an electromagnet positioned in close proximity to the fly wheel to provide an attractive force to generate additional power to assist rotation of the crankshaft during the compression stroke of said diesel engine.

* * * * *